(12) United States Patent
Schweid et al.

(10) Patent No.: US 7,359,093 B2
(45) Date of Patent: Apr. 15, 2008

(54) SYSTEMS AND METHODS FOR STREAK DETECTION IN IMAGE ARRAY SCANNING USING OVERDETERMINED SCANNERS AND COLUMN FILTERING

(75) Inventors: Stuart A. Schweid, Pittsford, NY (US); Shen-ge Wang, Fairport, NY (US); Paul A. Hosier, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 903 days.

(21) Appl. No.: 10/845,164

(22) Filed: May 14, 2004

(65) Prior Publication Data

US 2005/0254097 A1  Nov. 17, 2005

(51) Int. Cl.
*H04N 1/409* (2006.01)

(52) U.S. Cl. .................. 358/3.26; 358/463; 358/504; 382/275

(58) Field of Classification Search ............ 358/1.1, 358/1.9, 3.26, 3.27, 463, 471, 474, 496, 504, 358/514; 382/112, 254, 275, 309
See application file for complete search history.

(56) References Cited

U.S. PATENT DOCUMENTS

| | | | |
|---|---|---|---|
| 4,691,365 A | | 9/1987 | Nagashima |
| 5,266,805 A | * | 11/1993 | Edgar ................ 250/330 |
| 5,881,182 A | | 3/1999 | Fiete et al. |
| 6,034,794 A | | 3/2000 | Suganuma |
| 6,728,418 B1 | * | 4/2004 | Kumagai et al. ........ 382/275 |
| 6,832,008 B1 | * | 12/2004 | Wada .................. 382/275 |
| 7,058,236 B2 | * | 6/2006 | Ohashi ................. 382/275 |
| 7,113,619 B1 | * | 9/2006 | Matama ................ 382/112 |
| 7,119,926 B2 | * | 10/2006 | Takeda et al. .......... 358/1.9 |
| 2001/0028750 A1 | | 10/2001 | Asakura |
| 2002/0181033 A1 | | 12/2002 | Tandon et al. |
| 2003/0128889 A1 | * | 7/2003 | Maeda et al. .......... 382/275 |
| 2003/0147562 A1 | * | 8/2003 | Damm et al. .......... 382/275 |
| 2004/0027618 A1 | * | 2/2004 | Nakamura et al. ..... 358/3.26 |
| 2004/0057616 A1 | | 3/2004 | Kondo et al. |
| 2004/0125412 A1 | * | 7/2004 | Sugeta ................. 358/3.26 |
| 2005/0083543 A1 | * | 4/2005 | Suzuki et al. ........... 358/1.9 |

OTHER PUBLICATIONS

U.S. Appl. No. 10/740,493, filed Dec. 22, 2003, Gusmano et al.

* cited by examiner

*Primary Examiner*—Thomas D. Lee
(74) *Attorney, Agent, or Firm*—Oliff & Berridge, PLC

(57) ABSTRACT

A streak detection method and system in a fixed imaging array digital scanning system obtains image data from each of the plurality of rows in the at least one full color spectrum channel set of rows of positionally discrete sensors and integrates this data to produce an estimate of image data recorded by at least one clear channel row of positionally discrete sensors. A clear channel error signal is generated by the comparison to alert the operator to the presence of non-image data. The clear channel error signal may be refined to through a low pass column filtering process in order to filter out potentially erroneous clear channel error resulting from thermal, mechanical or other noise sources unrelated to image scanning. Stationary obstructions in the field of view of the imaging array, or defects in one or more sensors in the imaging array, are detected through this comparison which would otherwise appear repeatedly reproduced as streaks or lines in the reproduced output image.

33 Claims, 3 Drawing Sheets

SYSTEMS AND METHODS FOR STREAK DETECTION IN IMAGE ARRAY SCANNING USING OVERDETERMINED SCANNERS AND COLUMN FILTERING

BACKGROUND OF THE INVENTION

1. Field of Invention

This invention is directed to systems and methods for detecting streaks, such as streaks caused by imperfections appearing in the field of view of, or defects in, scanning systems that employ linear imaging arrays.

2. Description of Related Art

A variety of systems and methods are conventionally used in digital scanning. Typical scanning systems employ imaging arrays that are stationary with respect to the devices in which they are housed, or which are caused to move relative to a stationary substrate to be scanned. In such systems, constant or variable rate movement is effected between the image to be scanned and the imaging array. The imaging array takes a rapidly sequential series of pictures of the image medium that is presented to be scanned as the relative movement is effected. The scanning system then digitizes the image scanned for storage and/or reproduction.

Typical imaging arrays include multiple rows of individually pixilated sensors, each discrete pixel sensor being disposed to take these rapidly sequential digital images of the column of the image which is presented within that pixel sensor's field of view.

A difficulty in such systems is that any imperfection in the field of view of the imaging array either over a single sensor or over a group of sensors is repeatedly scanned and digitized as a dark spot in the scanned image. Alternatively, a defective sensor at a given pixel sensor location, in its failure to be able to scan, can likewise potentially be digitized as a dark spot. The result is that the reproduced output image from the device can include a streak or line corresponding with the position of the imperfection or the defective sensor as the image of the dark spot is repeatedly reproduced to form the streak or line.

Various exemplary scanning devices employ stationary Full-Width Imager Arrays (FWA) or linear Charge-Coupled Device (CCD) arrays. In such systems in which the imaging arrays are stationary, the arrays are often separated from the image medium to be scanned by a platen glass, or other transparent surface or lens, overlying the imaging array. Various exemplary methods are employed in these devices to move the image medium to be scanned across the transparent surface. One such exemplary method, commonly referred to as Constant Velocity Transport (CVT) scanning, employs a belt, drum or other like device to move the image medium to be scanned across a linear sensor, such as, for example, an imaging array of individually pixilated sensors.

A recognized problem in imaging array scanning systems, such as, for example, CVT scanning devices, occurs when dirt particles, stray paper fibers, contaminants, imperfections, obstructions and/or other objects appear on the transparent surface, or otherwise in the field of view of the imaging array. Such dirt particle, paper fiber, contaminant, imperfection, obstruction and/or other object remaining stationary on the transparent surface, or otherwise in the field of view over the imaging array, is repeatedly imaged and digitized as though it were part of the scanned image. The result is that the image reproduced by the exemplary CVT scanning device will include a streak or a line on the subsequently reproduced image.

A variety of systems and methods are employed to ensure that a platen glass or other overlying transparent surface is kept free of dirt particles, paper fibers, contaminants, imperfections, obstructions and/or other objects. These systems and methods are directed to improving reproduced image quality. Often the methods are manual, requiring visual inspection and manual cleaning of an exemplary system's platen glass or transparent surface. These methods can be mechanically automated in that a wiper blade, or the like, may be employed to routinely, automatically "wipe down" the platen glass or transparent surface. While limitedly effective in removing surface contaminants from a transparent surface, none of these methods account for obstruction or imperfection actually on an individual sensor, or for the potential of a defective sensor, providing the same sort of false scanned image data as an obstruction in the field of view of the array would produce on the overlying transparent surface.

Other systems and methods for improving reproduced output image quality include automated system steps that review the reproduced output image in comparison with the scanned image in order to detect, and optionally compensate for, differences before the reproduced image is ultimately displayed. One complication with such an approach is that it is difficult to determine whether a line which is digitized and reproduced as part of the output image is actually part of the image that was scanned or whether it was produced because the imaging array repeatedly scanned an imperfection stationary in its field of view, or otherwise input false or non-image data from one or a series of defective sensors, and then reproduced the non-image data as a line or streak in the reproduced image.

Difficulties in detecting dirt particles, paper fibers, contaminants, imperfections, obstructions and/or other objects are particularly acute as elements of foreign matter which commonly produce streaks in conventional and exemplary CVT scanning systems are extremely small. Any dirt particle, paper fiber, contaminant, imperfection, obstruction and/or other object generally large enough to be detected by simple visual inspection is, most often, large enough to be picked up by the scanned image medium as the scanned image medium is moved across the platen glass or other overlying transparent surface. The dirt particle, paper fiber, contaminant, imperfection, obstruction and/or other object is moved out of the way, swept away with the movement of the image medium being scanned. Dirt particles, paper fibers, contaminants, imperfections, obstructions and/or other objects that are very small, on the other hand, have a greater tendency to adhere to the transparent surface and to resist being swept away by the movement of the scanned image medium.

Among other systems and methods employed to remove streaks from digital images produced in CVT scanning systems, software algorithms exist that review stored image data representing the scanned image in its entirety. Such software algorithms apply image data revisions before reproducing a digitally scanned image in an output display device. A disadvantage in such methods is that full scanned image review algorithms require the scanning of the entire image and storage of the data representing the entire scanned image before reviewing the data and applying necessary image data revisions. In high speed scanning applications, this requirement to record an entire image and then review and revise that image before reproducing the image has the potential to slow the scanning and reproduction process to an unacceptable level.

U.S. patent application Ser. No. 10/740,493, filed Dec. 22, 2003, which is incorporated herein by reference in its entirety, discloses various exemplary embodiments for detecting streaks, such as streaks caused by imperfections in scanning systems that employ linear imaging arrays where the scanned image is sampled a minimum of two times by separate positionally discrete rows or sets of sensors in the imaging array. The at least two samples, though very close together, correspond to separate discrete linear scan locations. The scanned image data obtained from each of the two discrete rows is then normalized to adjust for different filtering capabilities, particularly color filtering in multispectral imaging arrays, in the discrete rows of the imaging array. The normalized scanned input image data from at least two discrete rows is then compared on a one for one basis in an attempt to detect imperfections overlying one or more rows of sensors in the imaging array.

SUMMARY OF THE INVENTION

This invention provides systems and methods for detecting dirt particles, paper fibers, contaminants, imperfections, obstructions and/or other objects in the field of view of an imaging array, or individual sensors, in digital scanning systems.

This invention further provides systems and methods for detecting dirt particles, paper fibers, contaminants, imperfections, obstructions and/or other objects that may lead to streaks and lines in images produced by digital scanning systems.

This invention separately provides systems and methods to detect other imperfections which could lead to streaks in an output image based on an input image scanned by a linear imaging array digital scanning system, such as, for example, imperfections that may be introduced from a defective sensor at a given pixel location or at a plurality of pixel locations.

This invention further provides systems and methods which present inputs to a user or operator for clearing an imperfection or correcting a defect that may lead to streaks and lines in order to yield clearer digitized images produced by such scanning systems.

In various exemplary embodiments of the systems and methods according to this invention, linear imaging arrays, such as, for example, Full-Width Imager Array (FWA) sensors of Constant Velocity Transport (CVT) scanning systems, contain multiple rows of sensors. These multiple rows generally include at least one full color spectrum channel set of rows of positionally discrete sensors usable to isolate individual colors for color reproduction. Often, it is a set of three rows which are linearly disposed across the field of view of the scanner to record, for reproduction, the full color spectrum of digitally reproduced color in the exemplary digital scanning system. The three rows may include, for example, a red channel row, a green channel row, and a blue channel row. The multiple rows also preferably include at least one clear channel row of positionally discrete sensors.

In various exemplary embodiments, the systems and methods according to this invention cause the image to be scanned discretely by each of the plurality of rows of sensors which comprise the at least one full color spectrum channel set of rows of positionally discrete sensors in the imaging array.

In various exemplary embodiments of the systems and methods according to this invention, the discrete image data thus obtained is mathematically integrated in order to generate an estimate of the image data expected to be viewed from the clear channel row of sensors. This estimate is generated using the data recovered from the full color spectrum channel set of rows of sensors, such as, for example, typically the red, green and blue channels.

In various exemplary embodiments of the systems and methods according to this invention, the expected clear channel video is compared to the actual clear channel video recovered from the at least one clear channel row. When the results of this comparison find that the actual clear channel video and the estimated clear channel video are similar, i.e., the differences in the data lie below a certain predetermined threshold, the scanned image data is considered to be closely related to the scanned image. When a result of this comparison lies above the predetermined threshold, differences will be attributed to one or more obscured or defective sensors in the imaging array. This process detects whether the data scanned by the imaging array is part of the scanned image, or is from dirt particles, paper fibers, contaminants, imperfections, obstructions and/or other objects in the field of view of the imaging array, or is from a defective sensor at a pixel location or set of pixel locations.

For dirt particles, paper fibers, contaminants, imperfections, obstructions and/or other objects in the field of view of the imaging array, or for defects in discrete sensors in the imaging array, the differences generated by such causes can be highlighted to the system user or operator, or automated, for cleaning and clearing, repair, calibration of the system, or for input to an image revision algorithm designed to remove non-image data that would produce streaks in reproduced output images. While provision for such image revision algorithms exist in the various embodiments according to this invention, the specific definition of such algorithms is beyond the scope of this invention.

In various exemplary embodiments of the systems and methods according to this invention, a clear channel error signal generated based on the difference between the integrated estimate of the input image data acquired from the at least one full color spectrum channel set of rows of sensors in an imaging array and the actual clear channel data received by the clear channel row of sensors in the imaging array can be further refined in order to normalize the data for motion quality error and certain other factors unrelated to specific scan capability of the imaging array. This refinement is effected through a low pass filtering operation that occurs on the clear channel error signal at each discrete lateral pixel sensor location that views a single column of the scanned image medium as the scanned image medium is transported past the imaging array. Data from each color diverse column of sensors at a specific lateral pixel location is compared in order to help reduce noise from any source including mechanical noise, thermal noise and the like in an effort to further improve image quality. This filtering operation can occur in parallel at every discrete pixel location looking only at the sensors that precede and succeed each other at that specific lateral location on, rather than looking across the row of sensors in, the imaging array. Such a refining step is usable to not only account for mechanical noise based on movement of the scanned image substrate across the field of view of the imaging array, but also can account for thermal noise, or any other noise source that may result in deterioration in image quality such as, for example, blurring.

It is important to note that a prerequisite to undertaking such a filtering step is that a clear channel error signal which represents image data deviation must be generated based on the difference between the integrated estimate of the input image data acquired from the at least one full color spectrum channel set of rows of sensors in an imaging array and the actual clear channel data received by the clear channel row of sensors in the imaging array.

In various exemplary embodiments of the systems and methods according to this invention, estimated data and actual data are compared to generate a clear channel error signal, this clear channel error signal representing the image data deviation between the estimated data and actual data, standing alone or subsequently column filtered, is usable to alert a user or operator to system degradation in order to improve image fidelity and image integrity in reproduced images.

In various exemplary embodiments, the systems and methods according to this invention enable a self-diagnostic problem-addressing capability in digital scanning devices and like multi-function machines in which such systems and methods are included.

These and other features and advantages of the disclosed embodiments are described in, or apparent from, the following detailed description of various exemplary embodiments of the systems and methods according to this invention.

BRIEF DESCRIPTION OF THE DRAWINGS

Various exemplary embodiments of the systems and methods according to this invention will be described, in detail, with reference to the following figures, wherein.

DETAILED DESCRIPTION OF EXEMPLARY EMBODIMENTS

Figure 1:
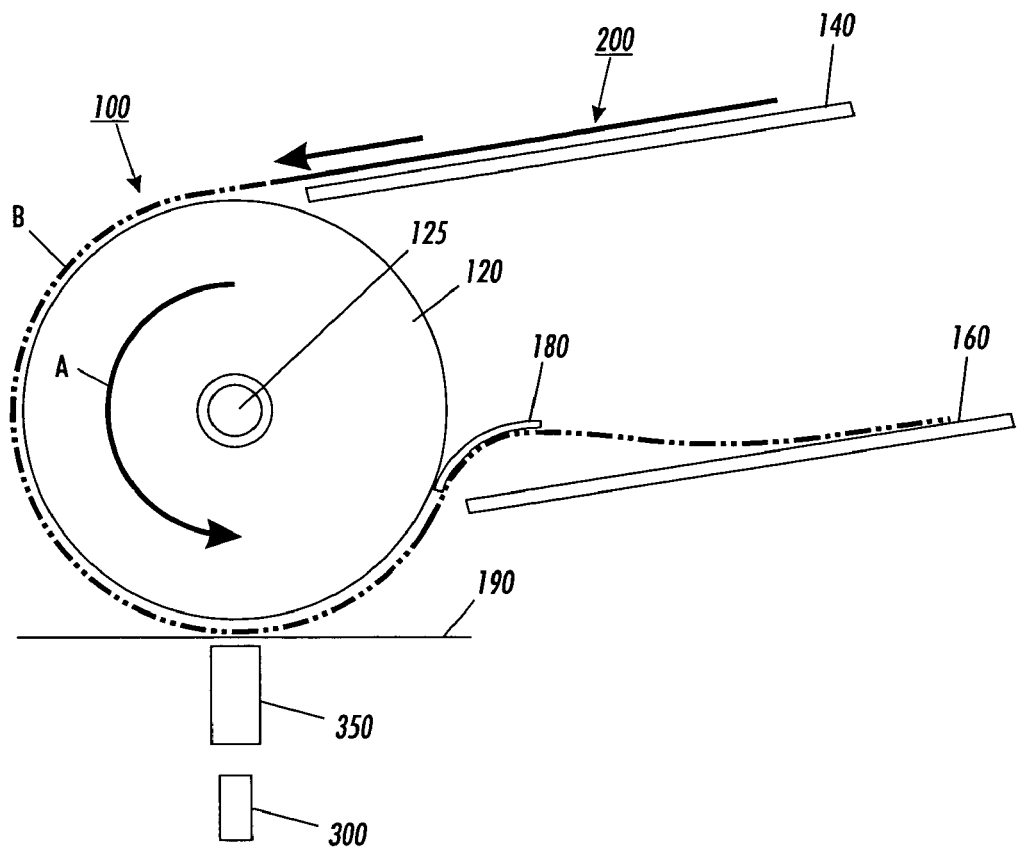
FIG. 1 illustrates an exemplary Constant Velocity Transport (CVT) scanning device usable with various exemplary embodiments of the systems and methods according to this invention.

The following description of various exemplary embodiments of streak detection systems and methods according to this invention may refer to and/or illustrate one specific type of digital imaging array scanning device, a CVT scanning device, for the sake of clarity and familiarity. However, it should be appreciated that the principles of this invention, as outlined and/or discussed below, can be equally applied to any known or later-developed system usable to record or reproduce images using an imaging array with multiple discrete rows or sets of sensors beyond the CVT scanning device specifically discussed.

Various exemplary embodiments of the systems and methods according to this invention enable streak detection by integrating image data recorded by each of a plurality of discrete rows of sensors in at least one full color spectrum channel set of rows of positionally discrete sensors usable to isolate individual colors for color reproduction in an imaging array, such as, for example, a Full-Width Imager Array (FWA), as found in, for example, scanners, copiers, facsimile machines and/or other digital imaging devices.

In various exemplary embodiments of the systems and methods according to this invention, non-image data is detected and isolated through a process of integrating the scanned input image data across at least one full color spectrum channel set of rows of positionally discrete sensors usable to isolate individual colors for color reproduction in the imaging array. An estimated value predictive of the image data which is expected to be actually collected from the sensors in the at least one clear channel row of positionally discrete sensors is obtained for comparison. Such non-image data may be, for example, dirt particles, paper fibers, contaminants, imperfections, obstructions and/or other objects which remain stationary on any transparent medium or surface through which the imaging array scans the presented image medium, or on the surface of the imaging array itself, or that appear otherwise in the field of view of the imaging array, or alternatively, may be defects in one or more individual sensors at a given pixel location.

In various exemplary embodiments of the systems and methods according to this invention, the system or method for streak detection is applied to currently available imaging array scanning devices without physical modification of such imaging arrays. An exemplary linear imaging array contains a plurality of discrete rows or sets, often, for example, four rows, of sensors, generally referred to as photosites, each of three of the rows containing filters designed to filter out a certain color or combination of colors. These rows are commonly identified by the colored filter with which they are fitted in order to filter out scanned image data of that color, i.e., blue, green and red. A fourth or clear channel row, typically, contains no color filtering and is referred to alternatively as a monochrome, clear, panchromatic, black-and-white or simply no-filter row. This fourth row is often included for higher speed reproduction of monochrome or black-and-white text images, often at externally-selectable increased scan rates. This is because the clear channel can accumulate more incident light than color filtered channels, allowing operation at higher scanning speeds. It should be appreciated, however, that the systems and methods for streak detection outlined in the various exemplary embodiments according to this invention are equally applicable to detection of obstructions over, or defects in, individual sensors whether the imaging array is scanning a color image or monochrome (or black-and-white) text images. The image can still be sampled across all rows and the image data from the three color rows integrated for comparison.

Though the discussion presented, and the exemplary embodiments depicted, will refer to and/or illustrate an FWA with four discrete rows as outlined above, additional rows of sensors may be added to increase the collected input of scanned input image data to produce increased fidelity in the integrated estimate of, and greater discrimination to the comparison to, actual clear channel collected data. It should be appreciated that, in order for the systems and methods according to this invention to function, as few as a single set of rows of sensors covering a full color spectrum for integrating data to formulate an estimate, and a single clear channel row for comparing data measured to the data estimate, in an imaging array, are adequate. It should also be appreciated, however, that multiple rows of sensors may be used integrated and correlated to provide clear channel data.

FIG. 1 illustrates an exemplary Constant Velocity Transport (CVT) scanning device 100 usable with various exemplary embodiments of the systems and methods according to this invention. As shown in FIG. 1, an exemplary embodiment of a CVT scanning device 100 contains a constant velocity transport device 120, depicted in FIG. 1 as a drum, which moves at a constant velocity in direction A about a spindle 125.

A feed tray 140 holds one or more image-bearing substrates 200 to be scanned. Image-bearing substrates such as, for example, pages of paper containing text or other images, are individually presented to the constant velocity transport device 120, also referred to below as a "CVT drum 120," from a document feeder 140. The individual image-bearing substrate 200 to be scanned is transported by the CVT drum 120 along path B as the CVT drum 120 rotates in direction A. The individual image-bearing substrate 200 is scanned as it is moved across a platen glass (or other transparent surface) 190 that lies between the CVT drum 120 and an imaging array 300, and often a focusing lens apparatus 350 which underlies the platen glass (or other transparent surface) 190. The scanned image-bearing substrate 200 completes its travel by being peeled from the CVT drum 120 by a baffle device 180, and deposited in an output tray 160.

In various exemplary embodiments of the systems and methods according to this invention, the imaging array 300 scans, digitizes and records the images presented from the image-bearing substrate 200 focused through the lens apparatus 350. As an image-bearing substrate 200 is transported across the platen glass 190 or other transparent element by the CVT drum 120, the imaging array 300 takes a series of rapid, sequential scans of the image. Scanned image data is digitized through systems in the CVT scanning device 100 and stored for later use and/or reproduced in real time as an output image.

Figure 2:
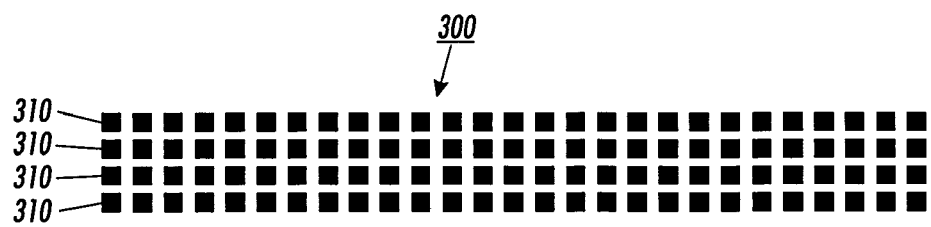
FIG. 2 illustrates a portion of an exemplary Full Width Imager Array (FWA) usable with various exemplary embodiments of the systems and methods according to this invention.

FIG. 2 illustrates a portion of an exemplary Full-Width Imager Array (FWA) 300 usable with various exemplary embodiments of the systems and methods according to this invention. As shown in FIG. 2, an FWA is generally formed of multiple discrete rows of individually pixelated sensors, also known as photosites. As a general convention, individual rows of sensors are arranged substantially perpendicular to the direction of travel of the image-bearing substrate as it is transported past the imaging array. Each row comprises a number of individual discrete sensors. As shown in FIG. 2, these individual sensors generally comprise near linear columns arranged substantially along the path of the motion of the image-bearing substrate as it is transported past the imaging array. It should be appreciated, however, that the systems and methods according to this invention are not limited to strictly linear arrays as depicted in FIG. 2, but rather could be applied to any imaging array with positionally separate sets of sensors that redundantly scan the same image, and contain at least one full color spectrum channel set of groups of positionally discrete sensors usable to isolate individual colors for color reproduction in an imaging array, and at least one clear channel group of positionally discrete sensors.

In various exemplary embodiments of the systems and methods according to this invention, the imaging array includes separate rows of sensors for isolating individual colors for color reproduction. Each individual row of sensors is designed to filter out a given color, and the row is commonly discussed by reference to the color filters located in the sensors of the row. For example, where a row of sensors is designated as a blue row, such row is intended to pick up all of the details of the image to be scanned, filtering those that are in the spectrum of blue colors. In the exemplary embodiment of the imaging array shown in FIG. 2, there is a blue row 310, a red row 320, a green row 330 and a clear channel row 340, alternatively referred to as a clear, panchromatic, black-and-white or no-filter row.

In various exemplary embodiments, each row of sensors in an exemplary imaging array is in a range of 25 µm to 75 µm tall in the columnar or scan direction, with a gap between each row of 10 µm to 20 µm. These ranges are exemplary, and typical of conventional FWA systems, and should be considered, in no way, limiting. In order to detect dirt particles, paper fibers, contaminants, imperfections, obstructions and/or other objects on the platen glass, or otherwise in the field of view of the imaging array, or internal defects in one or more individual sensors, sampling of the information presented to each of the color filter rows is accomplished.

In the exemplary embodiments depicted in FIG. 2, the information presented to each row of sensors 310/320/330 forming the at least one full color spectrum channel set of rows is individually sampled. The scanned image data is then transmitted to a streak detection system where the individual color row data is integrated to produce an estimate of the information that is sampled by the clear channel set, formed in this example by row 340. In its simplest form, the streak detection system according to this invention seeks to differentiate only between presence or absence of fixed obstructions in the field of view of the imaging array, or of defects in individual sensors, that may result in data being digitized as non-image data.

Figure 3:
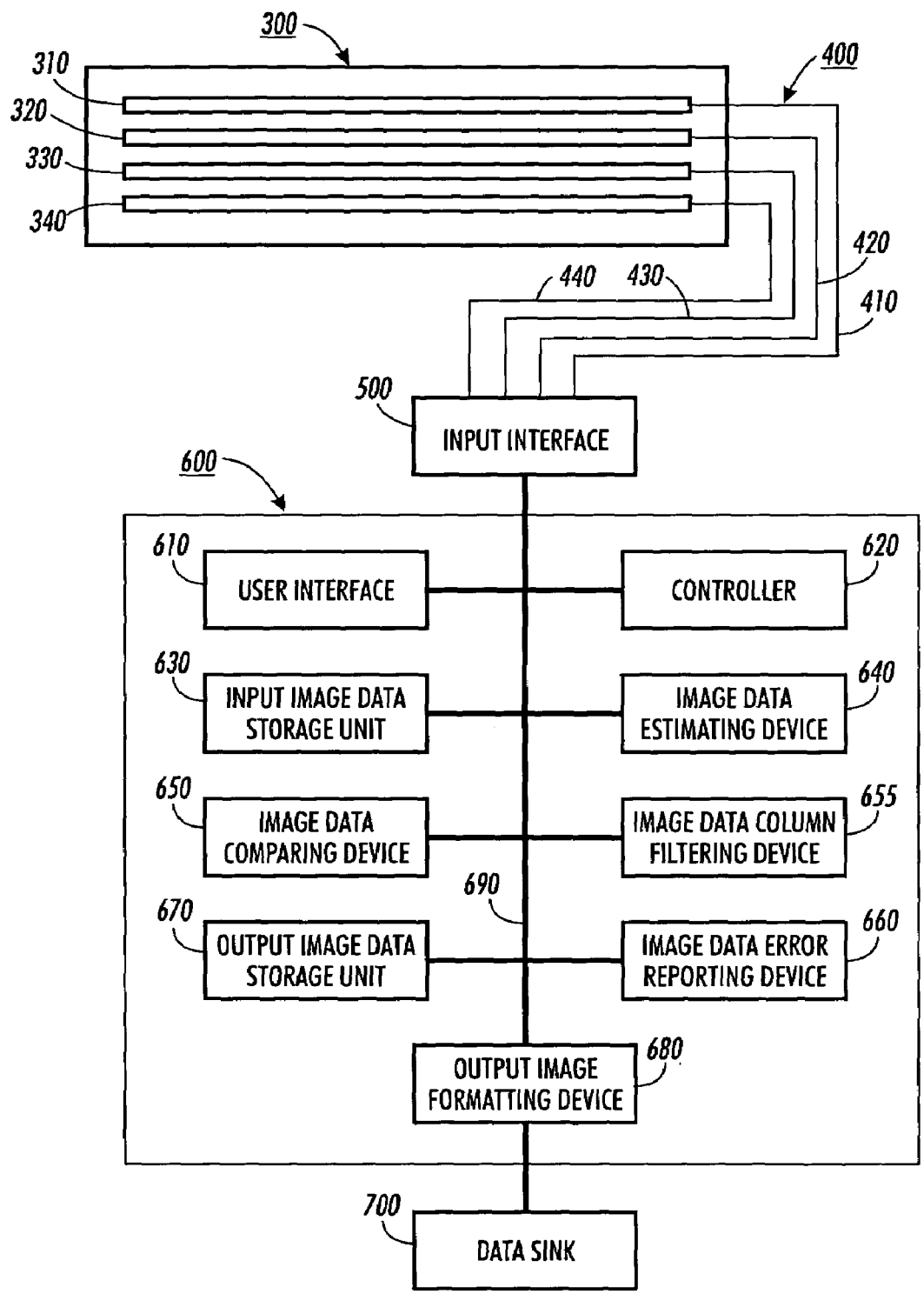
FIG. 3 is a block diagram of one exemplary embodiment of a system for streak detection according to this invention.

FIG. 3 is a block diagram of one exemplary embodiment of a system 600 for streak detection according to this invention. The system 600 receives input regarding scanned image data from the imaging array 300 via an information bus 400 and an automated input interface 500. The system 600 includes a user interface 610, a controller 620, an input image data storage unit 630, an image data estimating device 640, an image data comparing device 650, an optional image data column filtering device 655, an image data error reporting device 660, an output image data storage unit 670 and an output image formatting device 680 which are interconnected by a data/control bus 690. The system 600 is then connected to a data (or image) sink 700.

The system 600 is usable to implement, for example, the exemplary method for streak detection described below and shown in FIG. 4 under control of the controller 620, which controls the transmission of all data and/or control signals across the data/control bus 690 within the system 600. The imaging array 300 scans the image presented as the image-bearing substrate is transported past the imaging array 300 and provides digitally scanned image data through the information bus 400 via an automated input interface 500 to the system 600.

In various exemplary embodiments of the systems and methods according to this invention, positionally redundant data scanned by a plurality of individual rows of sensors depicted in FIG. 3 as four individual rows of sensors 310/320/330/340 provide a plurality of inputs to the system 600 through individual discrete input lines 410/420/430/440 in the information bus 400, or alternatively through a single line in the information bus 400 wherein discrete input information from separate rows of sensors is sequentially transmitted via the information bus 400.

The system 600 includes at least one input image data storage unit 630 usable to store discrete image data regarding the scanned image provided separately by each of the plurality of channels corresponding to the plurality of rows of sensors in the imaging array 300. The information input from each of the color filter rows in at least one full color spectrum channel set of rows of sensors is integrated according to a stored function in the image data estimating device 640. This generates an estimate of the expected clear channel video using the data input from each of the color filter rows in that at least one full color spectrum channel set of rows of sensors, i.e., the red, green and blue rows. In this exemplary embodiment, input comes from sensor rows 310/320/330, through the input interface 500 to the system 600, and may or may not be stored in the at least one input image data storage unit 630.

In the various exemplary embodiments of the systems and methods according to this invention, the imaging array has the ability to scan all channels simultaneously. In the illustrated example of four channels, all four channels are scanned simultaneously with the fourth, or clear channel, row having redundant information when compared to the data already contained in the other three color channels making up at least one the full color spectrum channel set of rows of sensors. That is, the spectrum of the clear channel can be reasonably estimated by a weighted combination of the data from each of the discrete rows of the at least one full color spectrum channel set.

From a mathematical perspective, it should be understood that every color across the full spectrum exists in a color subspace that is spanned by the three discrete color channel rows. Every color, therefore, imaged by the imaging array has a part that is contained in this subspace, and a part that is not. The clear channel spectrum has a part that is contained in the subspace, and a part that is not, as well. The clear channel spectrum can thus be represented as a weighted combination of the multi-color spectrums, i.e., red, green and blue spectrums in this exemplary embodiment. This mathematical equation is represented by the following:

$$C(\lambda)L(\lambda)=\alpha R(\lambda)L(\lambda)+\beta G(\lambda)L(\lambda)+\gamma B(\lambda)L(\lambda)+\epsilon+E(\lambda) \quad \text{(Equation 1)}$$

where
$C(\lambda)$ is the absorption spectrum of the clear channel,
$R(\lambda)$ is the absorption spectrum of the red channel,
$G(\lambda)$ is the absorption spectrum of the green channel,
$B(\lambda)$ is the absorption spectrum of the blue channel,
$L(\lambda)$ is the spectrum of the lamp,
$E(\lambda)$ is the spectrum of the fit error, and
$\epsilon$ is an optional fixed offset.

In order to have a small fit error $\alpha$, $\beta$, and $\gamma$ are chosen to minimize:

$$\int E^2(\lambda)d\lambda \quad \text{(Equation 2)}$$

where the values of $\alpha$, $\beta$, $\lambda$ and $\epsilon$ can be found using the orthogonality principle of estimation.

In the various exemplary embodiments of the systems and methods according to this invention, an empirical method could also be employed to determine the values of the above variables. A standard format document with known rich spectral information is presented and the estimating function above is accomplished against the known values presented in this calibration quality target scanned document. Individual color channel values and a clear channel value are measured and input. A multi-variate linear fit is then employed to determine the values of the variables.

The empirical approach was employed with a prototype four channel scanner to determine suitability of a linear fit in predicting the clear channel value. Results show that the linear approximation of the clear channel using the RGB values is accurate.

In various exemplary embodiments of the systems and methods according to this invention, the integrated estimate generated by the image data estimating device 640 is presented as one value to the image data comparing device 650 to be compared to clear channel image data values sampled by the clear channel set of sensors. In the case of a single clear channel row of sensors, such as the clear channel row 340 in the exemplary embodiment shown in FIGS. 2 and 3, actual image data values received directly from the scanned image data sampled by the clear channel row 340 are used for comparison. The result of this comparison is a value which, for ease of understanding, is defined as clear channel error $E_c$ which represents image data deviation between the integrated estimate generated by the image data estimating device 640 and actual image data values from the scanned image data sampled by the clear channel row, wherein:

$E_c$=clear channel−estimated clear$(R,G,B)$ $$\text{estimated clear}=\alpha R+\beta G+\gamma B+\epsilon \quad \text{(Equation 3)}$$

A threshold value T for $E_c$ is separately established and stored in the image data comparing device 650.

When there is no object obstructing any sensor, and/or no sensor is defective, the compared value of $E_c$ derived in accordance with the above equation falls below the predetermined, or alternatively, an optionally user selectable, threshold T. In prototype testing using a standard format document with rich spectral information the standard deviation for $E_c$ was measured at about 1 gray level in a known unobstructed and non-defective 256 level system. It is expected that, for $E_c$ as a random variable, the value $E_c$ would be nearly contained within 6 standard deviations over the page. For a page with no streaks, it would thus be expected that the absolute value of $E_c$ would be less than 6 at every point. As such, where the absolute value of $E_c$ is greater than 6, it could be concluded that such a value is due to at least one sensor being either fully or partially blocked or otherwise not producing clear video. The larger the absolute value of $E_c$, the higher the probability that the measured values are caused by something blocking at least one sensor, or by at least one internally defective sensor.

For any absolute value of $E_c$ that is greater than a selected threshold T, the system then generates a fault signal via the image data error reporting device 660 so that a user or operator is alerted to a condition that one or more sensors is fully or partially blocked by some occlusion, or one or more sensors is defective. The value for the threshold T is chosen to balance, or optimize, the detection of streaks against the risk of false detections. This relationship of clear channel error signal $E_c$ to the threshold T can be represented as follows:

$$\text{if}(|E_c|<T) \quad \text{(Equation 4)}$$

pixel is a valid pixel else
pixel is a streak pixel

The threshold value T can be determined using semi-static properties of the sensor, i.e., determined considering the overlap in average spectral response.

In various exemplary embodiments of the systems and methods according to this invention, once $E_c$ is determined in the image data comparing device 650, and prior to determining whether $E_c$ exceeds the threshold value T, an image data column filtering device 655 is optionally employed to refine $E_c$ to reduce effects of at least one of mechanical noise, thermal noise, and other like noise sources that could lead to erroneous indication of the presence on non-image data in the system.

The clear channel error $E_c$ representing image data deviation is optionally refined in order to normalize the data for motion quality error and certain other factors through a low pass filtering operation that occurs on the clear channel error measured at each discrete lateral pixel location that views a single column of the scanned image medium as it is transported past the imaging array. Data from each color diverse column of sensors is compared in order to help reduce noise from any source including mechanical noise and thermal noise in an effort to further improve image quality. This filtering operation occurs in parallel at every discrete pixel location looking only at the sensors that precede and succeed each other at that specific lateral location rather than looking across the row of sensors in the imaging array. The image data column filtering device 655 is usable to not only account for mechanical noise based on movement of the scanned image substrate across the field of view of the imaging array, but also can account for thermal noise, or any other noise source that may result in deterioration in image quality such as, for example, blurring. This filtering operation, by refining the clear channel error $E_c$, results in a refined clear channel error $E_{clp}$. In cases where the image data column filtering device 655 is employed to refine $E_c$ into $E_{clp}$, it is this latter value which is then compared to the threshold value T in the image data comparing device 650.

In various exemplary embodiments of the systems and methods according to this invention, should the image data comparing device 650 determine that $E_c$ or $E_{clp}$, as applicable, exceeds the threshold value T, in additional to alerting a user or operator to the possible presence of non-image data, an image data revising device (not shown) is optionally provided to modify the image data to revise portions of the digitized information to compensate for the presence of non-image data that would yield streaks in the output image prior to either storing the output image data in an output image data storage unit 670, or directly formatting the image data for output through an output image formatting device 680 which presents scanned, prepared and/or revised image data properly formatted for output to a data (or image) sink 700.

The data (or image) sink 700 may be, for example, a substrate on which the image is reproduced as a hard copy reproduction or other display medium such as, for example, a monitor. In general, the data (or image) sink 700 can be any device that is capable of outputting or storing the processed image data generated by the systems and methods according to this invention, such as a printer, a copier or other image forming device, a facsimile device, a display device, a memory, or the like.

In various exemplary embodiments of the systems and methods according to this invention, should the image data comparing device 650 determine that $E_c$ or $E_{clp}$, as applicable, exceeds the threshold value T, then the indication provided to the user or operator by the image data error reporting device 660 could be coupled with an automated interrupt to the image scanning operation performed by the digital scanning system. In any case, a user or operator is alerted to the likelihood that continued operation, without correction of the obscuration of the sensors, or defect to the sensors, will result in reproduced output images including streaks or lines. It should be appreciated that, though this process is discussed for clarity and simplicity as being a simple fault indication, in practice, such a process could be implemented in a manner to isolate the obscured or defective sensors with the objective of providing the user or operator clear indication of where precisely on or in the imaging array the particular obscured or defective sensor is located, i.e. at what pixel location.

While FIG. 3 shows the image data estimating device 640, the image data comparing device 650 and the image data column filtering device 655 as integral to the system for streak detection 600, the image data estimating device 640, the image data comparing device 650 and the image data column filtering device 655 may be one or more separate devices containing image estimating, comparing, and/or filtering subsystems or subroutines. Such exemplary image data estimating, comparing and filtering subsystems, subroutines or devices, whether integral to the system for streak detection 600, or individual stand-alone elements, may be implemented as software algorithms, hardware circuits or a combination of the two, standing alone or executed in combination with one another as a single software routine and/or hardware circuit, operating in serial or parallel modes.

In various exemplary embodiments of the systems and methods according to this invention, the image data storage units and associated devices can be implemented using any appropriate combinations of alterable, volatile or non-volatile memory, or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or any like medium. Similarly, the non-alterable or fixed memory can be implemented using any one or more of ROM, PROM, EPROM, EEPROM, an optical ROM disk, such as a CD-ROM or DVD-ROM disk, and disk drive or any like medium.

Figure 4:
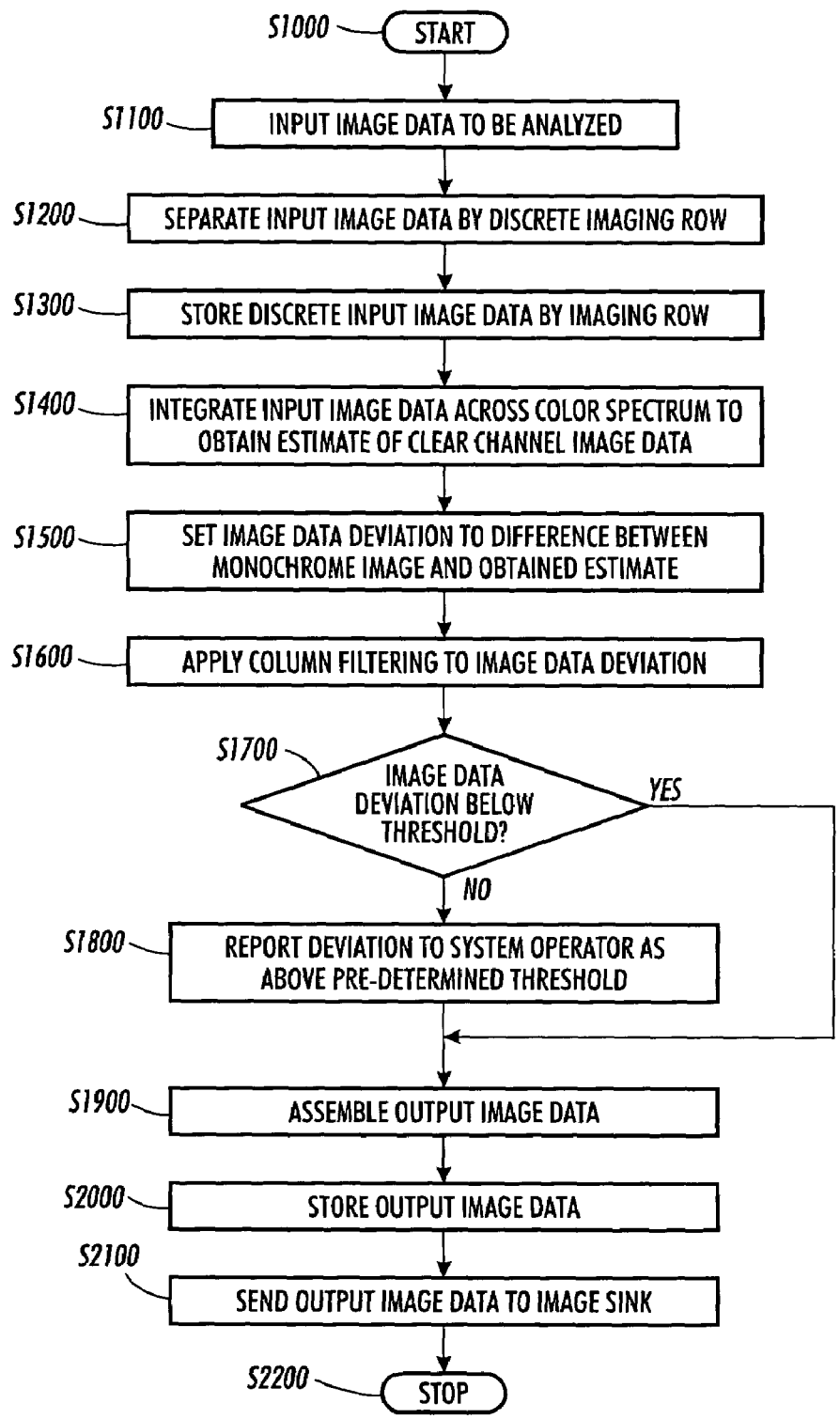
FIG. 4 is a flowchart outlining one exemplary embodiment of a method for streak detection according to this invention.

FIG. 4 is a flowchart outlining one exemplary embodiment of a method for streak detection according to this invention.

As shown in FIG. 4, operation begins at step S1000 and continues to step S1100, where image data to be analyzed is provided, substantially by an image-bearing substrate being scanned by an exemplary imaging array containing at least one full color spectrum channel set of rows of positionally discrete sensors usable to isolate individual colors for color reproduction and at least one clear channel row of positionally discrete sensors. The operation continues to step S1200.

In step S1200, the discrete image data to be analyzed, input in step S1100, is separated into discrete color specific channel or clear channel data separated by the discrete filter capability which the particular row or set of sensors includes. For example, in the embodiment depicted in FIGS. 2 and 3, there would be separate red channel, green channel and blue channel data. It should be appreciated that there is virtually no limit to the divisions of this information as long as information regarding a given color channel or clear channel is separated from information regarding any other color channel or clear channel. The operation continues to step S1300.

In step S1300, separated discrete image data to be analyzed is stored for a plurality of uses. Such uses include, but are not limited to, holding the data temporarily in order to perform the integration of the color channel data for the estimation required below, and optionally storing any or all of the input data for non-real time image comparison for streak detection, image revision, image enhancement and/or system calibration. The operation continues to step S1400.

In various exemplary embodiments of the systems and methods according to this invention, real-time image comparison based on the data provided by the separate rows of sensors in the imaging array is accomplished. Where the method includes only real-time comparison, and includes no other requirement, or beneficial purpose, for storing discrete image data for later use, step S1300 is limited. Regardless of the inclusion of optional non-real time storage requirements, a few lines of storage are required to support the temporary storage of discrete channel information for the integration for estimation and comparison functions.

In step S1400, separated discrete input image data from the at least one full color spectrum channel set of rows of positionally discrete sensors usable to isolate individual colors for color reproduction in the imaging array is integrated to provide an estimate of the data actually recorded by the at least one clear channel row of positionally discrete sensors, which may contain no color filtering, according to Equation 1 above. Such an integration step should result in the scanned input image data from the at least one full color spectrum channel set of rows of sensors being made to look substantially the same as that data actually recorded by the at least one clear channel row of sensors such that any detected differences in the image data will be solely the result of dirt particles, paper fibers, contaminants, imperfections, obstructions and/or other objects stationary in the field of view of, or the result of an internal defect in, one or more individual sensors. Ideally, this clear channel comparison to a combination of data collected and integrated from the full color spectrum of an exemplary group of three separate color filter rows of sensors provides improved streak detection in the systems and methods according to this invention. The operation continues to step S1500.

In step S1500, the integrated resultant estimate obtained in step S1400 and the actual image data gathered by the at least one clear channel row of sensors is compared. An arithmetic difference between the integrated image data estimate and the actual image data gathered is used to generate a clear channel error $E_c$, representing image data deviation, according to Equation 3. The operation continues to optional step S1600 or to step S1700.

The comparison step S1500 between data from separate sources that should mirror one another allows for detecting streak causes before the data is formatted for output as a digital image and is usable to alert a user or operator to an obstruction or defect that would result in degraded output images.

In step S1600, optional interpolation of data from adjacent pixels in a column is employed to reduce the sensitivity of the clear channel error $E_c$. A low pass filter is applied to each column. This column filtering is intended to attempt to limit the value of the clear channel error $E_c$ by filtering out certain deviations attributable to noise sources, i.e. mechanical noise, thermal noise, or other noise from non-precisely image related sources. The low pass filter applied to the clear channel error $E_c$ which represents image data deviation between the integrated resultant estimate obtained in step S1400 and the actual image data gathered by the at least one clear channel row of sensors is refined and the result is a refined clear channel error $E_{clp}$. For all processing which follows, when the optional low pass filter is applied, it is this refined clear channel error $E_{clp}$ which is used for comparison to a threshold value T. In all other cases, it is the original clear channel error $E_c$ which represents the raw comparison outlined above which is used to compare to the threshold value T. The operation continues to step S1700.

In step S1700, a determination is made whether the clear channel error $E_c$ or the refined clear channel error $E_{clp}$, as applicable, is less than a threshold T as an indication of whether there may be non-image data present. It should be appreciated that step S1700 is implemented using hardware devices, or in the alternative, software algorithms, or any suitable combination of software and hardware, to provide the determination step. If the determination made in step S1700 is that the clear channel error $E_c$, or the refined clear channel error $E_{clp}$, is less than the threshold T, the operation continues to step S1900 where the image data is assembled for output.

If the determination made in step S1700 is that the clear channel error $E_c$, or the refined clear channel error $E_{clp}$, is not less than the threshold T, the presence of non-image data is detected that could be from external obstruction of, or internal defect in, one or more sensors in the imaging array. Where $E_c$ or $E_{clp}$ exceeds T, non-image data is detected that may relate to the presence of dirt particles, paper fibers, contaminants, imperfections, obstructions and/or other objects stationary in the field of view of the imaging array, such as, for example, adhering to a platen glass which overlies, and is in the field of view of, the imaging array, or non-image data related to an internal defect in one or more sensors in the imaging array. The operation continues to step S1800.

In step S1800, the user or operator is alerted to the condition that the system has determined that the clear channel error $E_c$, or the refined clear channel error $E_{clp}$, is greater than the threshold T. Associated with such reporting could be automated steps to isolate the specific source of the non-image data, or separately to interrupt the scanning process of the imaging array. It should be appreciated that step S1800 is implemented using hardware devices, or in the alternative, software algorithms, or any combination of hardware and software, to provide the reporting step. The operation continues to optional step S1800 or step S1900.

It should be appreciated that step S1800 could include provision for optional image revision that may be applied to compensate for discovered non-image data associated with obstructions in the field of view of one or more of the sensors, or detected defects in one or more of the sensors, in the imaging array. If left uncorrected, when the output image data is assembled, a single stationary dirt particle, paper fiber, contaminant, imperfection, obstruction and/or other object in the field of view of one or more sensors in the imaging array, or a defect in a single sensor, would appear in the final output image as a streak or line.

In step S1900, output image data is assembled for presentation. This step can include formatting the digitized information based on the specific needs of the data (or image) sink to be employed. Operation then continues to optional step S2000 or to step S2100.

In optional step S2000, assembled output image data is stored for non-real time use. Such non-real time use includes, but is not limited to, storage for later presentation or optional system calibration operations. Operation then continues to step S2100.

In step S2100, output image data, optionally revised as required based on streak detection, and/or optionally stored for other uses, is output to a data (or image) sink, formatted as required to the capacity or capability of that data (or image) sink. Operation continues to step S2200 where the operation of the method stops.

In various exemplary embodiments, the systems and methods according to this invention are applicable to any devices that record or reproduce images using an imaging array with multiple discrete rows of sensors. Such devices include, but are not limited to, scanners, copiers, facsimile machines, digital image scanning devices, digital photocopying devices, xerographic reproduction devices, other digital imaging devices, and/or any image scanning and/or image reproduction devices.

In various exemplary embodiments of the systems and methods according to this invention, the algorithm can easily be extended if more than four channels are used.

Equation 3 above would be extended to a set of equations for each additional channel (i.e., those besides R, G, B). Also, Equation 4 above would become a vector compared to the threshold. In such an embodiment this would easily allow the extension, for example, of this invention to a six channel sensor where the red channel, green channel and blue channel are all duplicated.

While this invention has been described in conjunction with the exemplary embodiments outlined above, various alternatives, modifications, variations, and/or improvements, whether known or that are, or may be, presently unforeseen, may become apparent. Accordingly, the exemplary embodiments of the invention as set forth above are intended to be illustrative, not limiting. Various changes may be made without departing from the spirit and scope of the invention. Therefore, the systems and methods according to this invention are intended to embrace all known, or later-developed, alternatives, modifications, variations, and/or improvements.

What is claimed is:

1. A system for streak detection in a scanning device, comprising:
   an imaging array comprising at least one full color spectrum channel set of rows of positionally discrete sensors usable to isolate individual colors for color reproduction, and at least one clear channel row of positionally discrete sensors;
   an interface that transmits image data obtained from each of the plurality of rows in the at least one full color spectrum channel set of rows of positionally discrete sensors to an image data estimating device, and from the at least one clear channel row of positionally discrete sensors to an image data comparing device;
   an image data estimating device that integrates the image data from each of the plurality of rows in the at least one full color spectrum channel set of rows of positionally discrete sensors to generate an estimate of clear channel image data for comparing to actual clear channel row image data; and
   an image data comparing device that receives the actual image data from the at least one clear channel row of positionally discrete sensors and compares that data to the estimate of the clear channel image data generated in the image data estimating device to derive clear channel error data.

2. The system of claim 1, wherein the derived clear channel error data is compared, in the comparing unit, to a predetermined threshold to isolate the presence of non-image data.

3. The system of claim 2, wherein non-image data is attributable to at least one of a fixed obstruction in the field of view of at least one individual sensor and an internal defect in at least one individual sensor.

4. The system of claim 2, further comprising a fault warning indication that is usable to warn the system operator of the presence of non-image data.

5. The system of claim 2, further comprising a system interrupt that is usable to interrupt the scanning operation based on the presence of non-image data.

6. The system of claim 2, further comprising an image data revising device that applies revisions to image data based on isolation of non-image data.

7. The system of claim 1, further comprising a column filtering device usable to refine the clear channel error data to reduce effects of at least one noise source that could lead to erroneous indication of the presence of non-image data in the system.

8. The system of claim 7, wherein the derived clear channel error data is compared, in the comparing unit, to a predetermined threshold to isolate the presence of non-image data.

9. The system of claim 8, wherein non-image data is attributable to at least one of a fixed obstruction in the field of view of at least one individual sensor and an internal defect in at least one individual sensor.

10. The system of claim 8, further comprising a fault warning indication that is usable to warn the system operator of the presence of non-image data.

11. The system of claim 8, further comprising a system interrupt that is usable to interrupt the scanning operation based on the presence of non-image data.

12. The system of claim 8, further comprising an image data revising device that applies revisions to image data based on isolation of non-image data.

13. An image reproducing device including the system of claim 7.

14. An image scanning device including the system of claim 7.

15. A photocopying device including the system of claim 7.

16. A xerographic image reproducing device including the system of claim 7.

17. An image reproducing device including the system of claim 7.

18. The system of claim 1, wherein the at least one full color spectrum channel set of rows includes one each of a red channel row, a green channel row and a blue channel row.

19. The system of claim 1, further comprising an input image data storage unit that stores discrete image data obtained from each of the plurality of rows or sets of positionally discrete sensors in the imaging array.

20. The system of claim 1, further comprising an output image data storage unit that stores revised or unrevised image data formatted for output to a data sink.

21. An image scanning device including the system of claim 1.

22. A photocopying device including the system of claim 1.

23. A xerographic image reproducing device including the system of claim 1.

24. A method for streak detection in a scanning device, comprising:
   redundantly scanning an image with at least one full color spectrum channel set of rows of positionally discrete sensors usable to isolate individual colors for color reproduction, and at least one clear channel row of positionally discrete sensors;
   integrating the image data from each of the plurality of rows in the at least one full color spectrum channel set of rows of positionally discrete sensors to generate an estimate of clear channel image data for comparing to the actual clear channel row image data;
   comparing actual image data from the at least one clear channel row of positionally discrete sensors to the estimate of the clear channel image data generated in the image data estimating device to derive clear channel error data; and
   detecting the presence of non-image data in the image data obtained from the plurality of positionally separated rows of sensors by comparing the derived clear channel error data to a predetermined threshold to isolate the presence of non-image data.

25. The method of claim 24, further comprising alerting the system operator to the presence of non-image data in the system.

26. The method of claim 24, further comprising revising the image data to compensate for the non-image data.

27. The method of claim 24, wherein comparing actual image data from the at least one clear channel row of positionally discrete sensors to the estimate of the clear channel image data generated in the image data estimating device to derive clear channel error data further comprises refining the clear channel error data by applying column filtering to reduce effects of at least one noise source that could lead to erroneous indication of the presence on non-image data in the system; and detecting the presence of non-image data in the image data obtained from the plurality of positionally separated rows of sensors further comprises comparing the refined clear channel error data to a predetermined threshold to isolate the presence of non-image data.

28. The method of claim 27, further comprising alerting the system operator to the presence of non-image data in the system.

29. The method of claim 27, further comprising revising the image data to compensate for the non-image data.

30. The method of claim 24, further comprising storing image data collected by the at least one full color spectrum channel set of rows of positionally discrete sensors usable to isolate individual colors for color reproduction, and at least one clear channel row of positionally discrete sensors.

31. The method of claim 24, wherein redundantly scanning an image with at least one full color spectrum channel set of rows of positionally discrete sensors comprises redundantly scanning the image with each of a red channel row, a green channel row and a blue channel row.

32. The method of claim 24, further comprising formatting output image data for output to a data sink.

33. The method of claim 32, further comprising storing output image data formatted for output to a data sink.

* * * * *